United States Patent
Matsunaga et al.

(10) Patent No.: US 7,277,559 B2
(45) Date of Patent: Oct. 2, 2007

(54) MOBILE APPARATUS

(75) Inventors: Shinichi Matsunaga, Saitama (JP); Nobuo Higaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 760 days.

(21) Appl. No.: 10/702,478

(22) Filed: Nov. 7, 2003

(65) Prior Publication Data

US 2004/0096083 A1    May 20, 2004

(30) Foreign Application Priority Data

Nov. 19, 2002   (JP)   ............ 2002-334553

(51) Int. Cl.
*G06K 9/00* (2006.01)
*H04N 13/02* (2006.01)

(52) U.S. Cl. .................. 382/103; 382/106; 382/153; 348/47; 901/47

(58) Field of Classification Search ............... 382/103, 382/104, 106, 107, 153, 218
See application file for complete search history.

(56) References Cited

U.S. PATENT DOCUMENTS

| | | | | |
|---|---|---|---|---|
| 4,119,900 A | * | 10/1978 | Kremnitz | 701/23 |
| 4,573,191 A | * | 2/1986 | Kidode et al. | 382/106 |
| 4,799,267 A | * | 1/1989 | Kamejima et al. | 382/153 |
| 4,908,704 A | * | 3/1990 | Fujioka et al. | 348/155 |
| 5,638,116 A | * | 6/1997 | Shimoura et al. | 348/118 |
| 5,793,310 A | * | 8/1998 | Watanabe et al. | 340/995.14 |
| 5,801,760 A | * | 9/1998 | Uomori | 348/47 |
| 6,438,491 B1 | * | 8/2002 | Farmer | 701/301 |
| 6,577,334 B1 | * | 6/2003 | Kawai et al. | 348/148 |
| 6,975,246 B1 | * | 12/2005 | Trudeau | 340/903 |
| 2002/0038171 A1 | * | 3/2002 | Deguchi et al. | 701/41 |
| 2002/0159616 A1 | * | 10/2002 | Ohta | 382/104 |

FOREIGN PATENT DOCUMENTS

| | | |
|---|---|---|
| JP | 64-26913 | 1/1989 |
| JP | 07225126 A * | 8/1995 |
| JP | 08-329254 | 12/1996 |

(Continued)

OTHER PUBLICATIONS

Machine Translation of 2001-18898 cited in Applicant's IDS.*

*Primary Examiner*—Andrew W. Johns
*Assistant Examiner*—Anthony Mackowey
(74) *Attorney, Agent, or Firm*—Squire, Sanders & Dempsey L.L.P.

(57) ABSTRACT

A mobile apparatus is provided, which includes a plurality of imaging devices, a measurement device for measuring a current position and direction of the imaging devices, a map data storing section which stores map data including at least registered information on positions of stationary objects, a recognized distance calculating section which obtains a parallax for a plurality of images, a reference distance calculating section which calculates a reference distance from the imaging devices to a front border of each stationary object, a retracting section for determining a range of image processing, which selects a set of pixels to be processed so as to generate a retracted image, a detecting section for detecting objects from the retracted image, a transport device, and a transport controller for controlling movement of the transport device according to information about the objects detected by the detecting section.

12 Claims, 15 Drawing Sheets

FOREIGN PATENT DOCUMENTS

| | | |
|---|---|---|
| JP | 09-091438 | 4/1997 |
| JP | 11-104984 | 4/1999 |
| JP | 11-222882 | 8/1999 |
| JP | 2001-18898 | 7/2001 |
| JP | 9-86315 | 3/2007 |

* cited by examiner

NORMAL MODE OPERATION

OBJECT REGISTRATION

DELETION OF OBJECTS

JUDGMENT AND REGISTRATION OF ALERT ZONE

MOBILE APPARATUS

FIELD OF THE INVENTION

The present invention relates to a mobile apparatus such as a robot or a vehicle, which travels recognizing surrounding objects according to images captured by an imaging device.

BACKGROUND OF THE INVENTION

An image processing device has been known, which is able to recognize objects (obstacles) existing in the images that are captured by a camera such as a CCD camera. Japanese Published Patent Application 9-91438 discloses an apparatus for detecting mobile objects applicable to a robot and the like. The apparatus employing a camera, which is mounted on a mobile positioning mechanism and rotated about a vertical axis, stores images captured by the camera and detects the mobile objects introducing differential processing for the images. In this method the direction of camera is controlled by rotating the camera so that the center position of a camera lens can be fixed.

However, the apparatus for detecting mobile objects described above still poses a problem that a heavy load for image processing cannot be avoided since processing is conducted generally for all captured images in order to recognize mobile objects. Furthermore, if the apparatus is applied to a mobile robot or vehicle, it still leaves much to be desired in terms of recognition of obstacles such as mobile objects. The reason for this is that the position of a camera mounted on a mobile apparatus varies, so that the distances between the apparatus and stationary objects (obstacles) such as walls or fences always vary accordingly, which makes it difficult to distinguish mobile objects from the stationary ones and focus on recognition of the former.

SUMMARY OF THE INVENTION

The object of the present invention is to provide a mobile apparatus, which is able not only to travel in parallel with recognizing objects but also to accomplish a reduction in a load required of image processing.

An aspect of the present invention is to provide a mobile apparatus including a plurality of imaging devices and having a feature that the apparatus travels recognizing objects based on a plurality of images thereof captured by the imaging devices. The apparatus also includes: a measurement device which measures a current position and direction of the imaging devices; a map data storing section which stores map data including at least registered information on positions of stationary objects that exist within a region where the apparatus travels; a recognized distance calculating section which obtains a parallax for the plurality of images, thereby calculating a recognized distance from the imaging devices to each object; a reference distance calculating section which calculates a reference distance from the imaging devices to a front border of each stationary object according to the current position and direction measured by the measurement device and the map data; a retracting section for determining a range of image processing, which compares the recognized distance of a pixel of each image with the reference distance corresponding thereto, thereby selecting a set of pixels to be processed so as to generate a retracted image; a detecting section for detecting the objects from the retracted image; a transport device; and a transport controller for controlling movement of the transport device according to information about the objects detected by the detecting section.

The mobile apparatus described above travels while the detecting section is detecting objects such as people and obstacles and the transport controller is controlling the transport device such as legs of robots and wheels. Simultaneously, the images captured by the plural imaging devices such as CCD cameras enter the recognized distance calculating section, which calculates a distance from the imaging devices to an object as a recognized distance. The object includes both a stationary object which usually keeps a fixed position, such as a corridor, wall, desk and the like as a background and a mobile object such as a man, animal, temporarily laid baggage and the like.

On the other hand, the measurement device calculates the current position and direction of the imaging devices. The reference distance calculating section calculates the distance from the imaging devices to the front border of object on a closer side of the mobile apparatus, according to the map data as well as the current position and direction. Subsequently, the retracting section generates the retracted image to be processed, which is selected according to the comparison between a recognized distance of pixel and a corresponding reference distance.

The retracted image, which includes the information on limited objects that exist on this side of stationary objects, requires image processing in detail only for these limited objects, thereby allows a reduction in a load required of image processing. Also this mobile apparatus, which executes image processing referring to the map data in parallel with checking the current position and direction of imaging devices with the measurement device, can perform recognition of the stationary objects not only accurately but also efficiently.

Another aspect of the present invention is to provide a mobile apparatus, which has a feature that a retracting section is adapted to select a set of pixels out of images, whose recognized distances are smaller than reference distances thereof, so that the section can generate a retracted image.

Since an object existing further than a reference distance is assumed to lie behind a stationary object or in a shadow thereof, it is possible to consider that the probability of object rushing out into the front of mobile apparatus tends to be low. It is thus possible to narrow a range of image processing so that objects which lie further than the reference distances can be omitted from image processing. In other words, the retracting section selects only pixels whose recognized distances are smaller than corresponding reference distances as a result of comparison between the two for the images captured by the imaging devices.

Still another aspect of the present invention is to provide a mobile apparatus, which has a feature that a retracting section is adapted to generate a retracted image incorporating a whole image when number of pixels, whose recognized distances are greater than reference distances by a first predetermined value or more, is equal to or greater than a second predetermined value.

The mobile apparatus is able to travel autonomously recognizing a current position with a measurement device. However, it is preferable that the mobile apparatus has a failsafe function which allows safe travel even if some types of error occur, such as failure in updating map data or in measurement of position and direction. When the number of pixels, whose recognized distances are greater than reference distances by a predetermined value or more, is equal to or greater than the other predetermined value, it is preferable for the retracting section to generate a retracted image according to the whole captured image, taking into account a possibility of potential errors. This approach enhances the safety of a mobile apparatus. In this connection, the predetermined value in terms of difference in the distances takes, for example, 1 to 5 m and the other one in terms of number of pixels takes 30% of the captured image, for example. These values can be determined properly depending on the accuracy of a measurement device.

If the map data has stationary objects such as walls, pillars, desks, shelves and the like, it is possible to execute efficient image processing by making failsafe judgment for reference distances defined by the walls and pillars, beyond which no objects can be detected theoretically.

Yet another aspect of the present invention is to provide a mobile apparatus, which has a feature that a reference distance calculating section has a limiter for setting an upper limit of distance which controls reference distances to be less than or equal to the upper limit.

The mobile apparatus, which eliminates pixels of an object lying further than a predetermined distance, can reduce a load required of image processing.

The predetermine distance is not limited to a constant value and may take a variable value depending on the conditions. For example, it may be possible to select a variable value in such a manner that the value becomes larger for the center area of an image but smaller for the peripheral area. It may also be possible to vary the value according to the external environment in terms of brightness.

A further aspect of the present invention is to provide a mobile apparatus further including a map managing section, which has a feature that the section labels to store the data of an object detected by a detecting section and commands a map data storing section to store at least the information about the position correlated with the object as map data if the object is detected repeatedly at a position equal to or greater than a predetermined times.

The mobile apparatus described above, which judges that an object is stationary if the object is detected at a position repeatedly, stores the object in the map data storing section, eliminating it from a range of image processing.

Though map data, which includes data of a position correlated with the information on an object such as shape and size, can serve adequately, it may be preferable if the map data includes the identification of an object additionally, a mobile object such as a man or a stationary object such as a wall, desk or baggage. The area for storing the map data may be located within a file where stationary objects are registered or another file prepared separately. Whichever approach in terms of file is selected, a reference distance calculating section and the like will access to the map data with which new objects are registered.

A still further aspect of the present invention is to provide a mobile apparatus, which has a feature that a map managing section includes an updating section which deletes a stationary object registered in map data from a map data storing section if the stationary object is not detected.

The mobile apparatus described above, which updates the map data each time a stationary objects disappears, can detect obstacles securely, thereby allowing the safety.

Since the mobile apparatus of the present invention omits the area of a stationary object in detection of an object in a normal mode, it may be preferable to conduct detection of objects for a whole image, regularly or irregularly. In other words, it may be preferable for the mobile apparatus to have a checking mode, in which a detecting section executes direct detection of objects for a whole captured image bypassing extraction performed by a retracting section. And a map managing section may execute a checking mode regularly or irregularly so as to perform detection for the objects in the whole captured image.

A yet further aspect of the present invention is to provide a mobile apparatus, which has a feature that when a change rate of recognized distance is equal to or greater than a third predetermined value in a distribution of recognized distance calculated by a recognized distance calculating section, a transport controller judges that a mobile apparatus is in an alert zone and gives a command ordering a reduction in traveling speed of the transport device.

The area which has a larger variation rate in the distribution of recognized distance coincides with that lying behind an object, and thereby it is probable that a mobile object is hiding. The transport device, which slows down its speed coping with this situation, can maintain the safety. Whether or not a variation rate is equal to or greater than a standard value can be judged in the following manner. A difference in recognized distance between a pair of pixels neighboring each other, which is calculated by a recognized distance calculating section, is subjected to comparison with the standard value.

Another aspect of the present invention is to provide a mobile apparatus, which has a feature that when a change rate of reference distance is equal to or greater than a fourth predetermined value in a distribution of reference distance calculated by a reference distance calculating section, a transport controller judges that a mobile apparatus is in an alert zone and gives a command ordering a reduction in traveling speed of the transport device.

The mobile apparatus of this case is able to slow down its traveling speed in the same manner as that of a method introducing a change rate of recognized distance.

Still another aspect of the present invention is to provide a mobile apparatus, which has a feature that when a transport controller judges that a mobile apparatus is an alert zone, the transport controller changes a direction of the imaging devices.

The mobile apparatus described above is able to check the safety, which incorporates image information while the imaging devices are looking around in the alert zone.

DESCRIPTION OF THE PREFERRED EMBODIMENTS

Embodiments of the present invention are now described referring to the accompanying drawings.

a. First Embodiment

Figure 1:
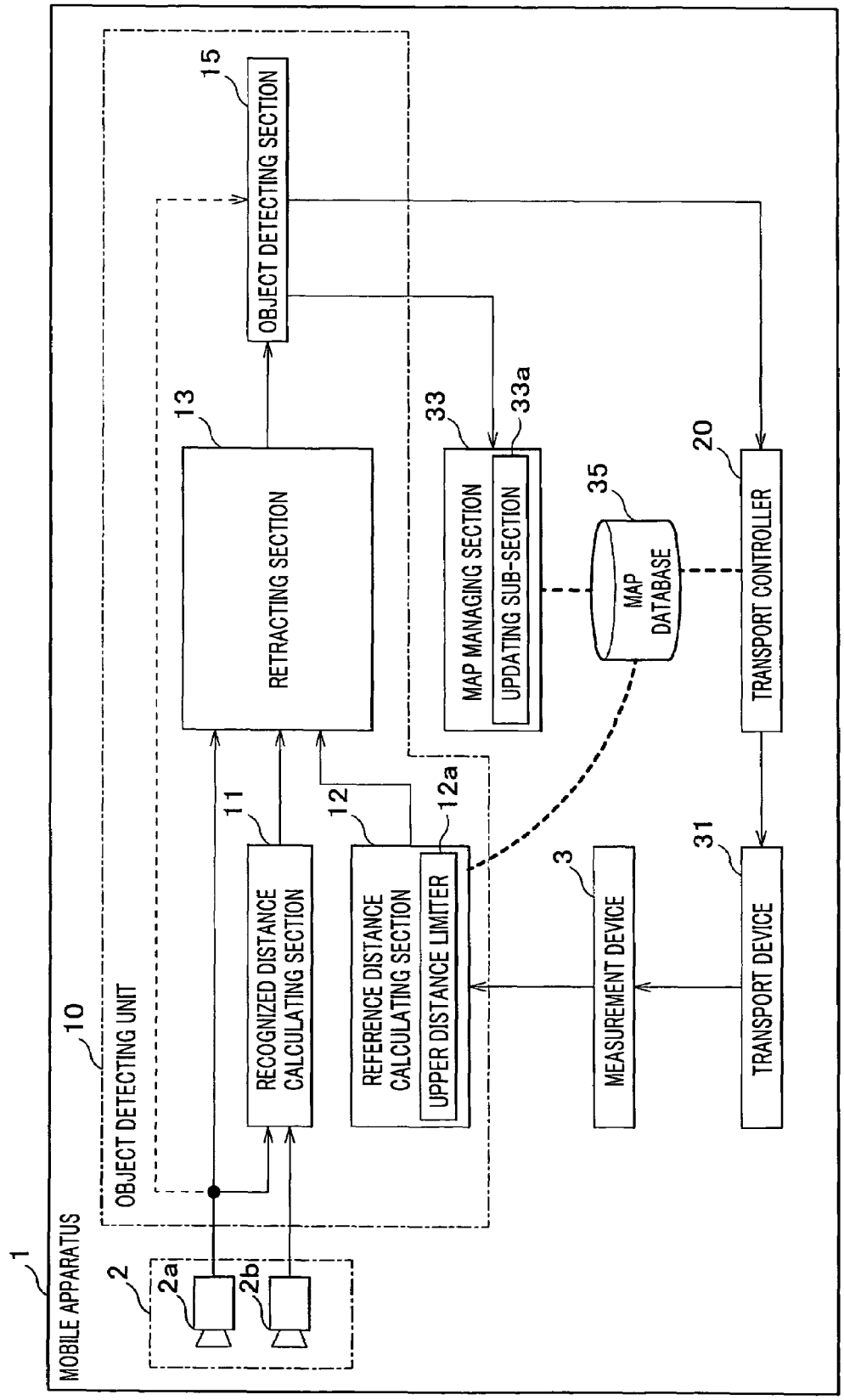
FIG. 1 is a functional block diagram illustrating a mobile apparatus according to a first embodiment of the present invention.

As shown in FIG. 1, a mobile apparatus 1 according to a first embodiment includes an imaging device such as a camera 2, an object detecting unit 10, a transport controller 20 and a transport device 31. The camera 2 captures images, the object detecting unit 10 analyzes the images to detect mobile objects mainly such as man, and the transport controller 20 determines next steps according to the result of detection, sending a command to move the transport device 31. In the present embodiment, a robot is selected exemplarily for a mobile apparatus 1, which may includes a robot or vehicle. The mobile apparatus 1 has a map database 35 and a map managing section 33 for controlling the map database 35. The mobile apparatus 1, which accesses to the map data in map database 35 based on a current position measured sequentially by a measurement device 3, achieves the improvement of efficiency of object detection and accuracy thereof. A map database 35 refers to a map data storing section in the appended claims.

The camera 2 has right and left cameras 2a, 2b, which provide the information on parallax. An image captured by each camera enters the object detecting unit 10. The cameras 2a and 2b, which serve as right and left eyes of a robot, are installed on the head of robot, having a given space therebetween and seeing in approximately the same direction. In the present embodiment, the right camera 2a is defined as a principal camera of the two cameras 2a and 2b.

The number of cameras may be modified to three or more so as to calculate a recognized distance. For example, nine cameras disposed three rows by three columns, in which the center camera serves as a principal camera, can measure the distance between the camera and an object more accurately according to parallaxes relative to other cameras.

The measurement device 3, which employs a gyro sensor or a GPS sensor, is able to measure a position and direction of camera 2.

It is necessary to handle a set of an image and a position and direction which are obtained simultaneously by the camera 2 and measurement device 3, respectively. In the present embodiment, a control unit (not shown) is provided to meet the requirement, which controls the camera 2 and measurement device 3. The control unit, which generates synchronizing pulses, triggers the camera 2 and measurement device 3, giving the same frame number to the image and measured data. Image processing is executed while synchronized according to a frame number after the object detecting unit 10 receives an image and measured data.

The object detecting unit 10, which detects an object according to a set of two images captured by the camera 2 and a position and direction of the camera 2 measured by the measurement device 3, includes a recognized distance calculating section 11, a reference distance calculating section 12, a retracting section 13 and an object detecting section 15.

The recognized distance calculating section 11 embeds the parallax of two camera images captured by the right and left cameras 2a, 2b simultaneously as the information on a distance from the camera 2 to an object (the information on a distance from the focal point of camera 2 to an object), generating a distance image.

The recognized distance calculating section 11, in which the right camera 2a serves as a principal camera, generates a distance image in the following manner. The section 11 performs block matching in a given block such as 16 by 16 pixels between the images captured by the principal camera (right camera 2a) and left camera 2b simultaneously, thereby calculating a parallax relative to the reference image captured by the principal camera. In this way, the section 11 generates a distance image, in which a parallax is correlated with each pixel of the reference image.

When a parallax Z is observed, a distance D from the camera 2 to an object is obtained by the following expression. In this connection, symbols F and B represent the focal distance of camera 2 and a distance between the right and left cameras 2a, 2b, respectively.

$$D = B \times F / Z$$

The reference distance calculating section 12 receives a current position and direction of the camera 2 measured by the measurement device 3 and reads out map data from the map database 35. According to the data, the section 12 determines a distance, based on which a judgment on whether or not image processing is required is made, for each pixel or horizontal position.

Figure 2:
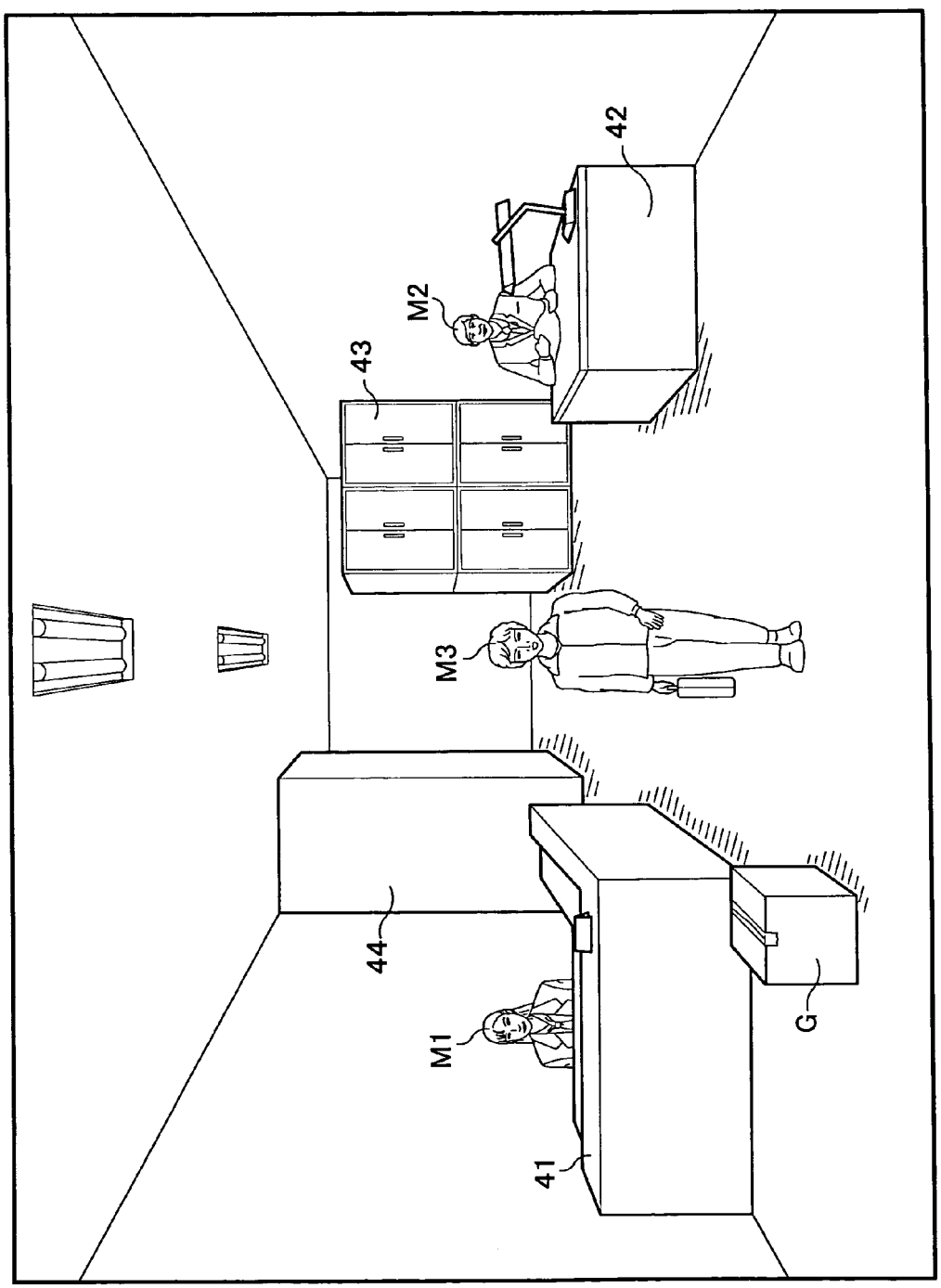
FIG. 2 is an example of image captured by a camera.
Figure 3:
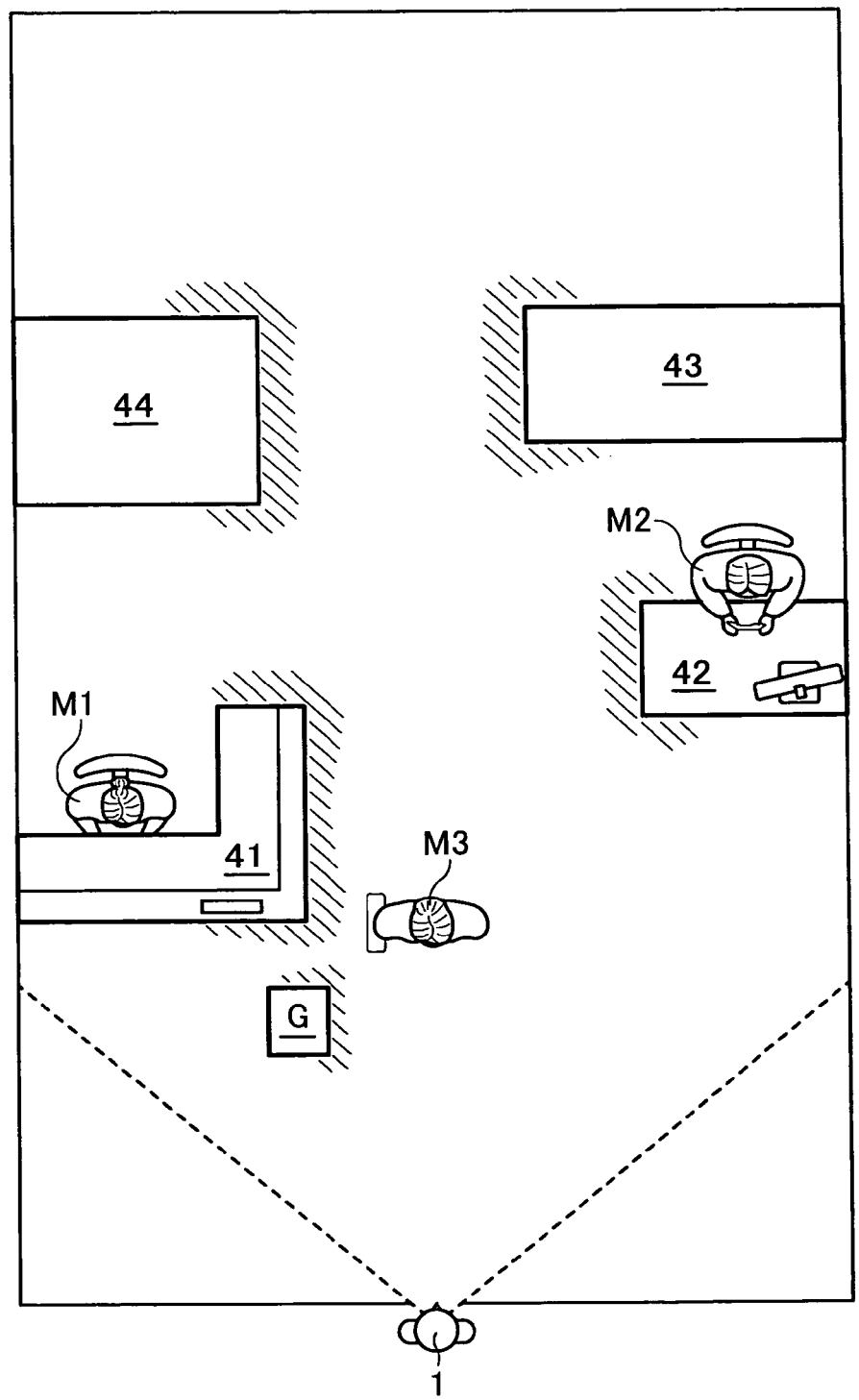
FIG. 3 is a diagram showing a top view of FIG. 2.
Figure 4:
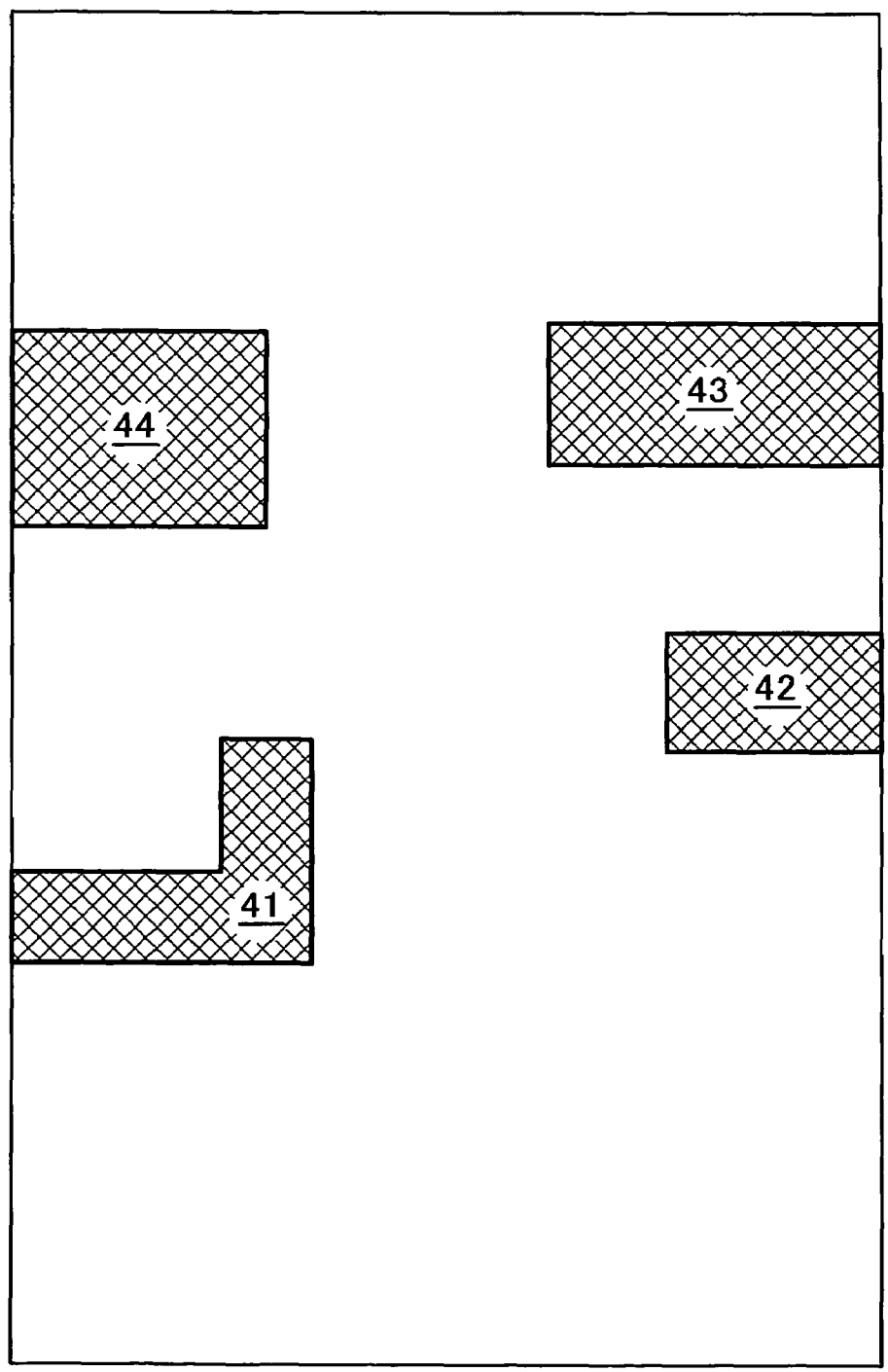
FIG. 4 depicts map data for the image shown in FIG. 2.

Description in more detail is now given referring to FIGS. 2-4. FIG. 2 is an example of image captured by a camera. FIG. 3 is a diagram showing a top view of FIG. 2. FIG. 4 depicts map data for the image shown in FIG. 2. The reference distance calculating section 12 calculates the focal axis of camera 2 according to a current position and direction of the camera 2 sent by the measurement device 3, obtaining map data within a field of view from the map database 35. In FIGS. 2 and 3 are shown a counter 41, a desk 42 and a book shelf 43, which are laid out in a room. Behind the counter 41 and desk 42, on the further side of camera 2, a person M1 and the other person M2 are sitting. Also behind the counter 41 lies a pillar 44 projecting from a wall on the left side of room. On this side of the counter 41 baggage G is laid on the floor and a person M3 is standing on the right side of baggage G.

There are stationary objects such as the counter 41, desk 42, book shelf 43 and pillar 44 in the room. Shapes of these objects as viewed from the top are registered in the map data shown in FIG. 3.

Since it can be assumed that objects and people behind the stationary objects do not rush into the front of a mobile apparatus 1 normally, the mobile apparatus 1 of the present embodiment omits the area behind these stationary objects from a range of image processing.

Figure 5:
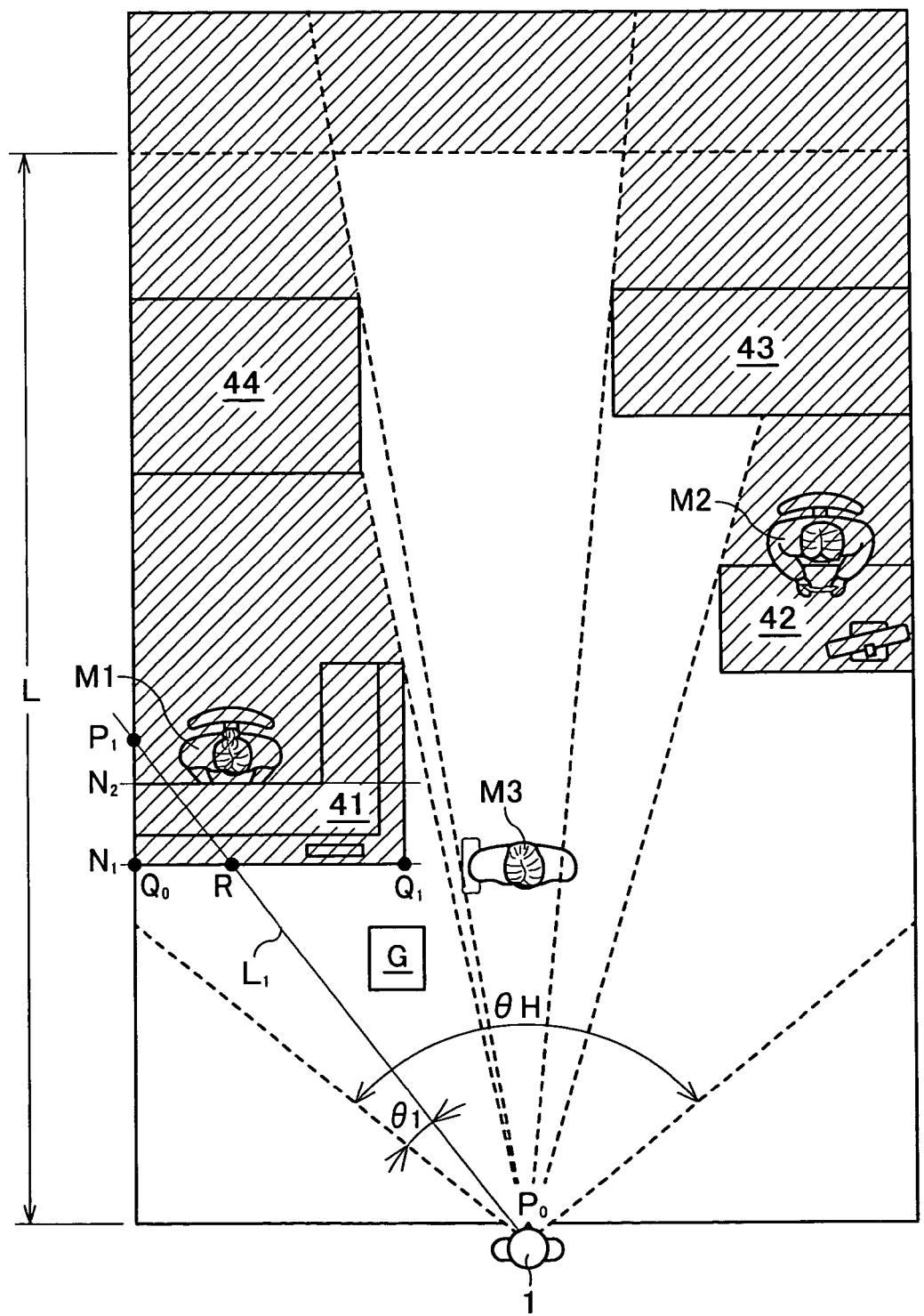
FIG. 5 is a diagram illustrating a method for determining a reference distance by a mobile apparatus seeing the room in FIG. 2.

FIG. 5 is a diagram illustrating a method for determining a reference distance when the mobile apparatus 1 looks the room in FIG. 2. As shown in FIG. 5, while the mobile apparatus 1 is looking from the bottom to top in FIG. 5, a camera 2 captures images in a horizontal angle of coverage (field of view) $\Theta_H$.

The mobile apparatus 1 calculates a distance between the camera 2 and the front border of a stationary object per line of sight assigned for each pixel in a horizontal direction. An example of calculation of a reference distance for line of sight $L_1$ is explained. The mobile apparatus 1 calculates an intersection R between the line of sight $L_1$ and a front border $N_1$, thereby determining a reference distance between the camera 2 and intersection R according to a current position and direction of the camera 2. In case another intersection with a front border $N_2$, which lies behind the counter 41, is also obtained unnecessarily, it is possible to cope with it by selecting a minimum reference distance. Similarly, a reference distance for a line of sight assigned for every pixel can be calculated.

A method for calculating an intersection is now described. When map data is arranged so that a border line of stationary object is registered in a vector format, the method results in a calculation of intersection between a line of sight vector and a border vector.

A necessary and sufficient condition required for two lines intersecting each other is expressed by the following expressions.

$$|Q_0 - P_0, P_1 - P_0| \cdot |Q_1 - P_0, P_1 - P_0| < 0$$

$$|P_0 - Q_0, Q_1 - Q_0| \cdot |P_1 - Q_0, Q_1 - Q_0| < 0$$

where a pair of coordinates $P_0$ ($xr_0$, $yr_0$) and $P_1$ ($xr_1$, $yr_1$) as well as the other pair of coordinates $Q_0$ ($xs_0$, $ys_0$) and $Q_1$ ($xs_1$, $ys_1$) define the lines, respectively. $|A, B|$ represents a vector product between vectors A and B.

If the condition is met, an intersection R between the two lines is obtained by the following expressions.

$$R = P_0 - (|P_0 - Q_0, Q_1 - Q_0| / |P_1 - Q_0, Q_1 - Q_0|) \cdot (P_1 - P_0)$$

$$= Q_0 - (|P_1 - P_0, Q_0 - P_0| / |P_1 - P_0, Q_1 - P_0|) \cdot (Q_1 - Q_0)$$

As shown in FIG. 1, a reference distance calculating section 12 has an upper distance limiter 12a. If a calculated reference distance is greater than a predetermined upper limit, the upper distance limiter 12a replaces the distance with the upper limit. It is not necessary to select a constant value for the upper limit. For example, it is possible to set a larger value for the center area of image and a smaller value for the peripheral area, so that closer attention can be paid for the center area and objects lying further can be recognized. It is also possible to select upper limits taking into account the surroundings, where a mobile apparatus 1 travels. For example, it may be possible to select a generally smaller upper limit when the mobile apparatus 1 travels in a building, so that the mobile apparatus 1 recognizes a relatively nearer zone only. On the other hand, it may be possible to select a larger upper limit when the mobile apparatus travels outside. Furthermore, it may be preferable to select a smaller upper limit during low speed traveling and a larger upper limit during high speed traveling so that the mobile apparatus 1 can travel more safely.

The processing executed at the upper distance limiter 12a is explained referring to FIG. 5. The upper distance limiter 12a replaces a calculated reference distance with a typical distance L, if the distance exceeds the typical distance L.

A retracting section 13 determines a range of image processing for a captured image according to recognized distances and reference distances. Specifically speaking, the retracting section 13, which compares a recognized distance of each pixel obtained by a recognized distance calculating section 11 and a corresponding reference distance, selects a pixel if the recognized distance is smaller than the reference distance. Otherwise, the retraction section 13 discards the pixel. A reference distance for a pixel is defined as a distance between a camera 2 and the horizontal position of pixel. Discarded pixels are schematically shown by slashed areas in FIG. 5. In this connection, if color information is applied to identification of a pixel, a method can be adopted, which identifies discarded pixels by uniformly assigning a black color digitally represented by a value of zero. In this way, the retracted image as a result of selecting pixels, whose recognized distances are smaller than reference distances, results in a figure shown in FIG. 6. The slashed areas in FIG. 6 correspond to those of discarded pixels, which are represented by a black color, for example.

When the retracting section 13 compares a recognized distance and a reference distance of each pixel, the section 13 counts the number of pixels (hereinafter referred to as a number of error pixels) whose recognized distances are larger than reference distances by a predetermined value or more. The predetermined value, which may be selected as required, takes 1 to 5 m, for example. In the present embodiment, the value is selected to be 3 m. If the number of error pixels reaches equal to or greater than a predetermined value, for example 30% of the total pixel number, the retracting section 13 replaces a retracted image with the other image without discarding of pixels. In this way, even if there exist errors in recognition of a current position and a map, it is possible to maintain a complete image before discarding of pixels for image processing, which provides a failsafe mechanism to enhance the safety. It should be noted that a pixel counted as an error with this method is not always erroneous. In order to cope with this phenomenon a method like the following can be adopted. A judgment associated with failsafe is made only for reference distances, which are calculated for stationary objects such as a wall, a pillar, a desk and a book shelf. In this way, the percentage of actually erroneous pixels relative to the pixels counted to be erroneous increases, so that it is possible to perform more efficient image processing without unnecessarily frequent failsafe checking. In the method described above, it may be possible to set a lower value such as 10% instead of 30%.

In the present embodiment, which employs two-dimensional map data, stationary objects in the map data are regarded as extending infinitely in a vertical direction. If map data is arranged in a three-dimensional format, which can include heights of stationary objects such as the counter 41 and book shelf 43, it is possible to determine a reference distance for each pixel and make a comparison between a reference distance and a recognized distance for each pixel, so that pixels whose recognized distances are smaller than reference distances are selected. In this way, it is possible to include a person M1 behind a counter 4 as an object for image processing.

Known detecting methods can be applied to an object detecting section 15, which detects objects in an image.

For example, Japanese Published Patent Application 8-329254 discloses an outline extraction technique (dynamic outline model: SNAKES). An outline model is generated based on the initial ambiguous outline of an object in an image and the outline of an object is extracted by applying deformation to the outline model in accordance with a predetermined rule. Matsuoka, Araki, Yamazawa, Takemura, Yokoya report the other method titled "Extraction and Tracking for the Outline of a Mobile Object using Mobile Camera Images and Real-time Processing by DSP" the Institute of Electronics, Information and Communication Engineers, Technical Report of IEICE PRMU97-235, 1998.

In the method, it is assumed that the movement of a mobile camera, which is derived by analyzing the timewise continuous brightness information of images, coincides with the movement of a background. Subsequently, the range of a mobile object is detected based on a difference between consecutive images and the movement of background, and thereby the outline of an object is extracted.

Figure 6:
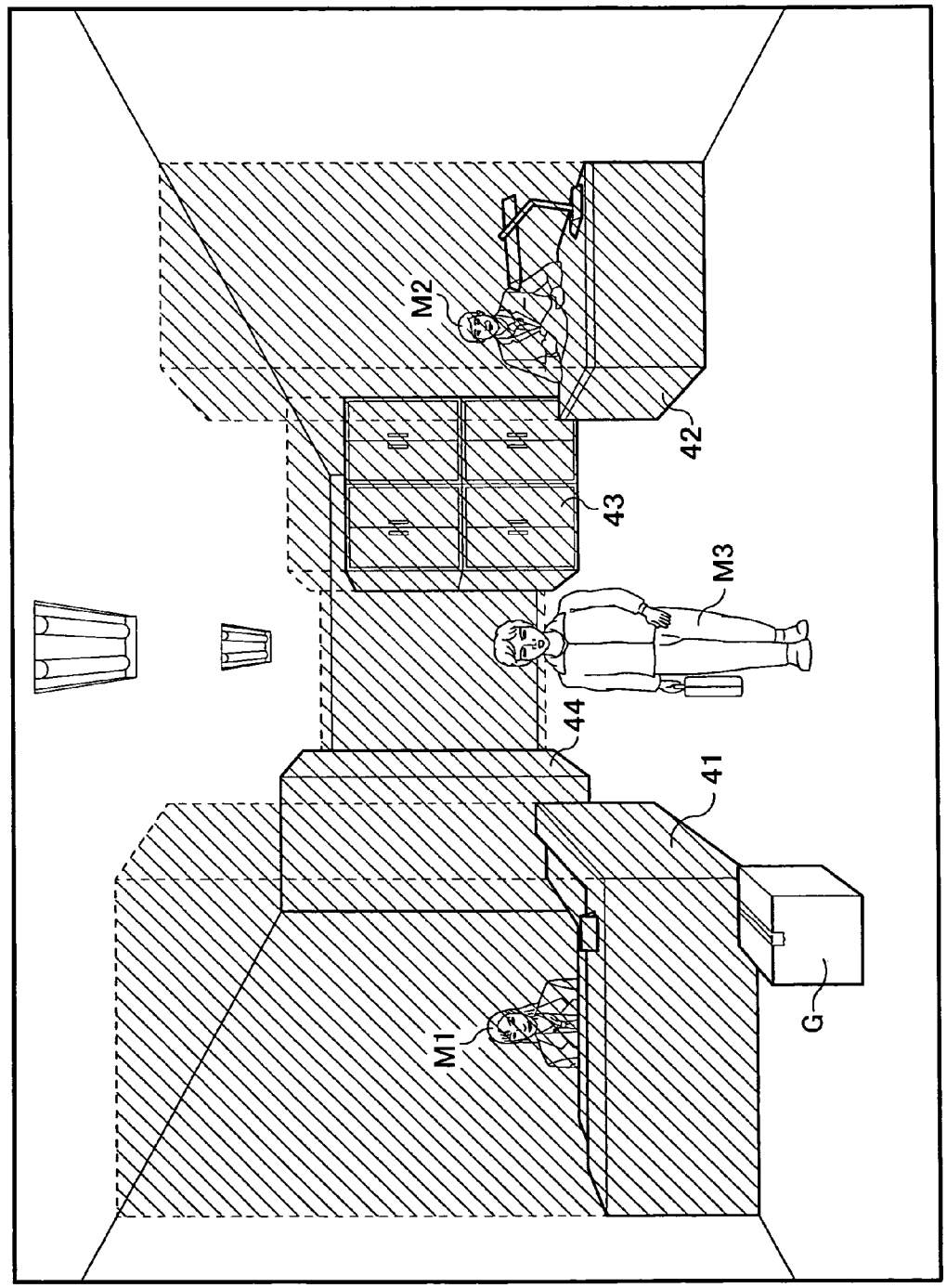
FIG. 6 is a figure illustrating a retracted image.

An object detecting section 15 detects objects basically in an image which the retracting section 13 selects. For example, as shown in FIG. 6, the object detecting section 13 executes image processing to extract objects for an image which includes only a floor, a ceiling, right and left walls, a person M3 and baggage G. In this way, the load of image processing required of the object detecting section 15 can be reduced.

The object detecting section 15 has a whole checking mode, which performs detection of objects for a whole image captured by a camera 2 regularly such as every 100 frames, or irregularly each time a mobile apparatus 1 travels a predetermined distance. As shown in FIG. 1 with an arrow of broken line, it is possible to execute this whole checking mode by sending an image captured by a right camera 2a to the object detecting section 15, bypassing discarding of pixels at a retracting section 13.

A transport controller 20, which receives the information of objects detected by an object detecting section 15 and other information (not shown), determines the next movement of a mobile apparatus 1, thereby driving a transport device 31. The transport device 31 includes, for example, an actuator for a leg of robot (not shown). When a vehicle serves as a mobile apparatus 1, wheels, a drive system, an engine and a steering mechanism fill the role of a transport device 31.

A map managing section 33 is responsible for controlling a map database 35. When a mobile apparatus 1 recognizes a new stationary object, the section 33 registers the object in the map database 35. On the other hand, when a registered stationary object disappears, the section 33 deletes the data of object registered in the map database 35.

The map managing section 33, which registers an object temporarily in a memory if it is recognized once, registers the object formally in the map database 35 if it is detected repeatedly at a position more than a predetermined times. More specifically, the section 33, which receives the data of an object detected by an object detecting section 15, identifies a position and shape for the object, making a comparison thereof with both the existing map data and temporarily registered data of objects. If the position and shape coincide with those in the former, the section 33 deletes the data of object. If they coincide with those in the latter, the section 33 counts the number of detection. If they coincide with neither, which means that the object is recognized newly, the section 33 registers the data of object temporarily with an ID label. If an object which is not registered in the map data is detected repeatedly at a position more than several times, it is assumed to be a stationary object. Accordingly, the section 33 registers the object in the map database 35 as a stationary object correlated with the position thereof. It may be possible to select a number of recognition arbitrarily based on which registration of an object is determined, 10 or 50 for example. In this embodiment, the number is selected to be 10. Registration of data may be performed by introducing another database instead of the map database 35. It should be noted that data in this case is also correlated with a position of stationary object, so that a reference distance calculating section 12 has access to the data, which is corresponding to "map data" in the appended claims.

The map managing section 33 further has an updating section 33a. When a registered stationary object disappears, the updating section 33a deletes the data of object from the map database 35. Specifically, when a detecting section 15 have detected objects from a whole image in a whole checking mode, the updating section 33a searches map data for each object. If an object is not detected though it is registered in the map data within a current field of view, the updating section 33a deletes the object.

The operation of a mobile apparatus 1 of the first embodiment is described referring to FIGS. 8-11 and FIG. 1 as required.

Figure 8A:
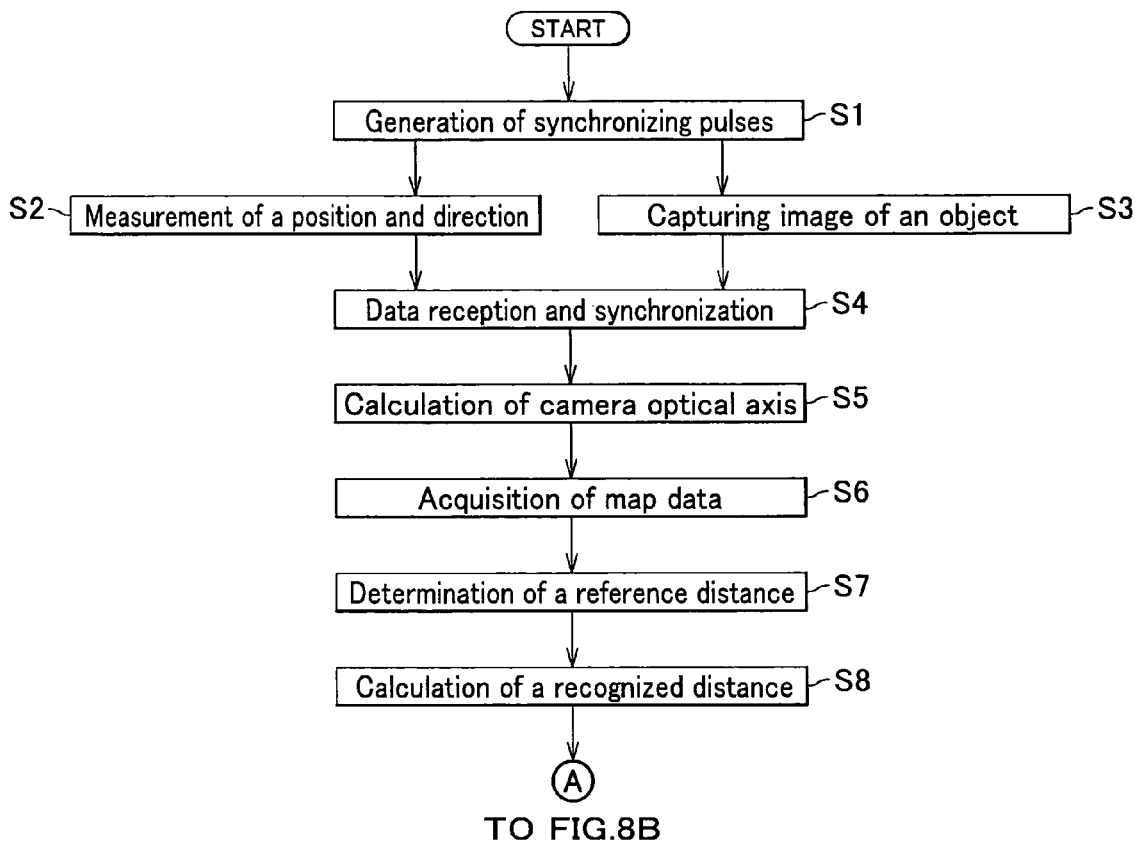
FIGS. 8A and 8B are a flow diagram showing steps for a normal mode.
Figure 8B:
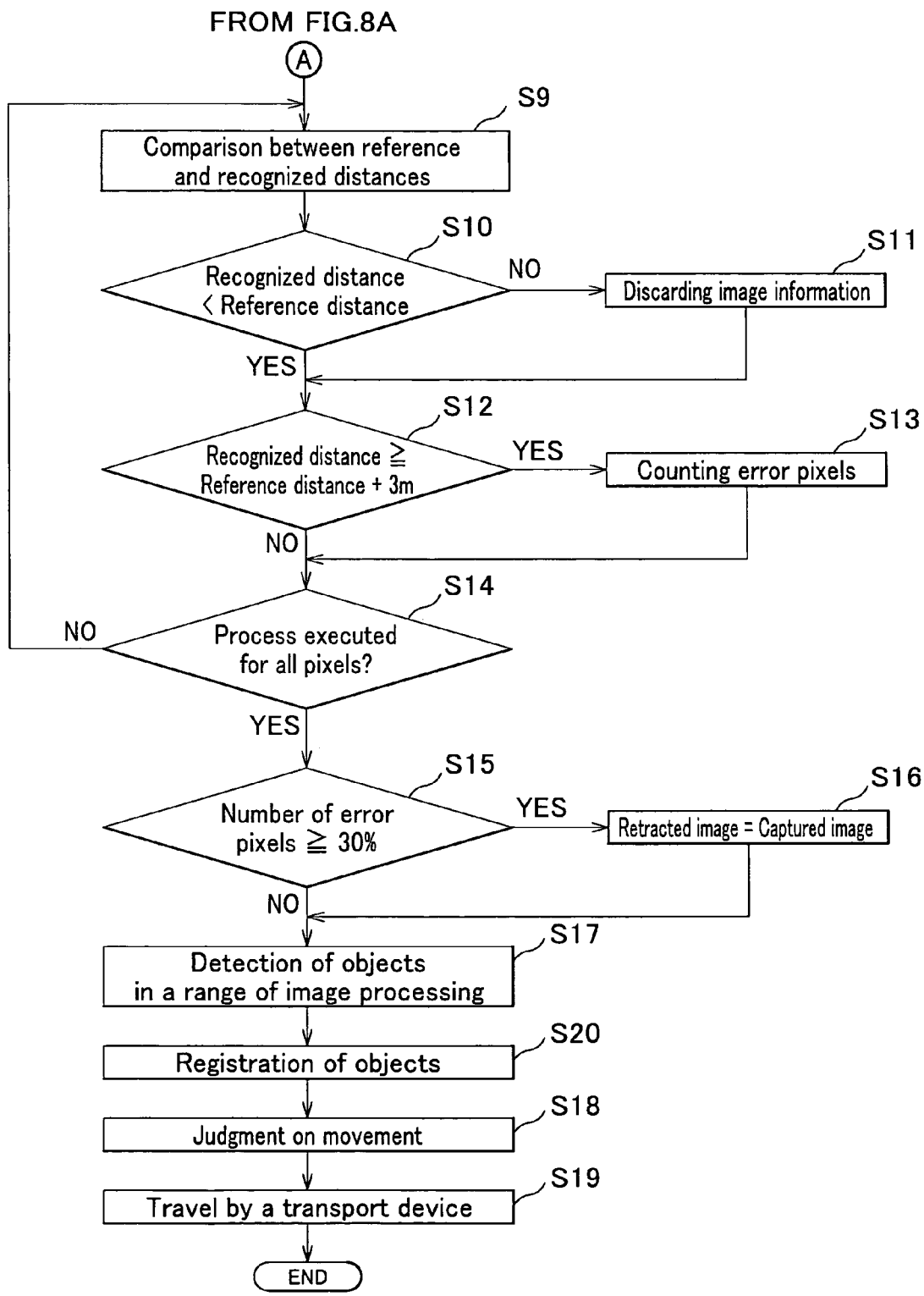

FIGS. 8A and 8B are a flow diagram illustrating a flow for a normal mode.

The mobile apparatus 1 initiates the flow commanding a control unit (not shown), which controls a camera 2 and a measurement device 3, to generate synchronizing pulses (step S1). Subsequently, the measurement device 3 measures a current position and direction of the camera 2 (step S2) and the camera 2 captures an image simultaneously for an object (step S3). The image captured by the camera 2 and the current position and direction of camera 2 measured by the measurement device 3, which enter an object detecting unit 10 after having a frame number respectively, are sorted by an input port (not shown) according to the frame number so as to be synchronized each other (step S4).

A reference distance calculating section 12, which receives the current position and direction of camera 2, calculates the optical axis of camera 2 according to the current position and direction of camera 2 (step S5). And the section 12 obtains map data from a map database 35, which is in a range of captured image derived from the optical axis and angle of coverage (step S6).

An intersection is calculated between a line of sight of the camera defined for a horizontal position of each pixel of image and the front border of a stationary object. The distance between the intersection and the camera 2 is then determined as a reference distance (step S7). If an upper limiter 12a judges that the reference distance exceeds a given distance L, the upper limiter 12a replaces the reference distance with the distance L (step S7). In this way, a reference distance for each pixel according to the horizontal position thereof can be determined.

At the same time, a recognized distance calculating section 11 calculates a recognized distance for each pixel according to a parallax of pixels captured by right and left cameras 2a and 2b, respectively (step S8).

A retracting section 13 compares a referenced distance and a recognized distance for each pixel (step S9). In this connection, the recognized distance is compared with the reference distance obtained for the horizontal position of a pixel. If the recognized distance is equal to or greater than the reference distance (No at a step S10), the retracting section 13 sets image information to be zero and deletes the image (step S11). If the recognized distance is less than the reference distance (Yes at the step S10), the retracting section 13 keeps the image information.

Next, the retracting section 13 judges if the recognized distance is greater than the reference distance by 3 m or more by comparison of the two. If it is (Yes at a step S12), the retracting section 13 counts an error pixel, adding one to the number of error pixels (S13). If it is not (No at the step S12), the flow proceeds to the next step.

At a step S14 it is judged if the steps S9-S13 are performed for all the pixels. If not (No at the step S14), all the steps S9-S13 are repeated, and if it is (Yes at the step S14), the flow proceeds to the next step.

The retracting section 13 judges if the number of error pixels is equal to or greater than 30%, and if it is (Yes at a step S15), the retracting section 13 replaces a retracted image with a image without retraction (step S16). If it is not (No at the step S15), the flow proceeds to the next step.

An object detecting section 15, which receives the retracted image selected by the retracting section 13, detects objects within the retracted image (within a range of image processing) (step S17). According to the information about detected object a map managing section 33 performs registration processing (step S20). At the same time the information enters a transport controller 20. The transport controller 20 judges the safety and traveling feasibility for the next movement according to the objects detected by the object detecting section 15 (step S18), giving a command for travel to a transport device 31. The transport device 31 transports a mobile apparatus 1 after receiving the command.

Figure 9:
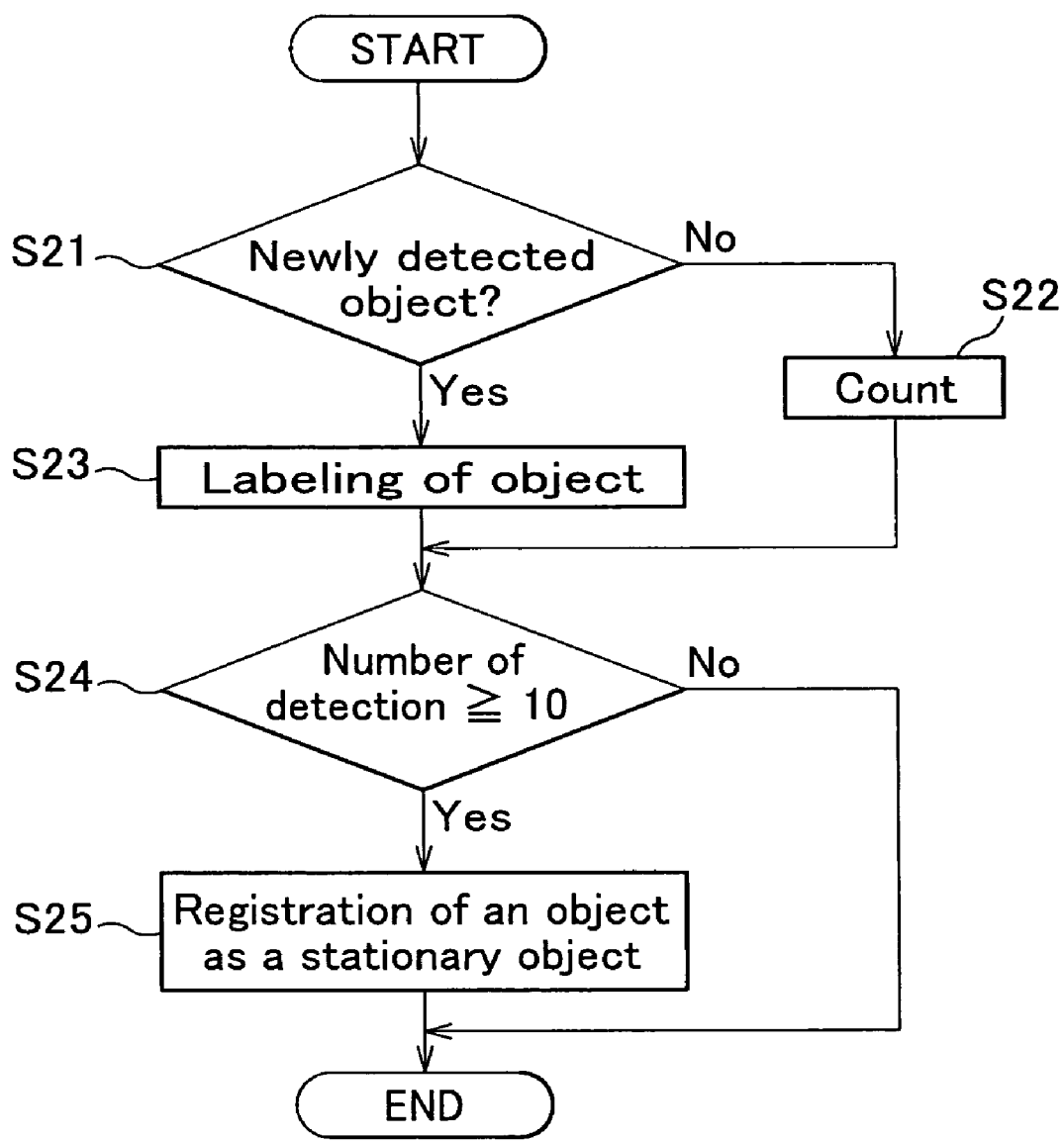
FIG. 9 is a flow diagram showing steps for registration of objects.

Description is given for processes for registering objects at the step S20 referring to FIG. 9.

An object detected by the object detecting section 15 is checked whether or not it is newly detected, by making a comparison for a position and shape of the object with both the existing map data and temporarily registered object data (step S21). If the position and shape coincide with those in the former, the data of object is deleted because the map data does not require updating. If they coincide with those in the latter, it is judged that the object is not newly detected (No at the step S21). Subsequently, the number of detection is counted (step S22). If they coincide with neither, it is judged that the object is newly recognized (Yes at the step S21). The data of object is then labeled with an ID and registered temporarily (step S23). Next a judgment is made whether or not the object is detected equal to or greater than 10 times (step S24) and if it is (Yes at the step S24), the object is registered as a stationary object in a map database 35 correlated with the position thereof (step S25). On the other hand, if it is not (No at the step 24), the flow stops.

Figure 7:
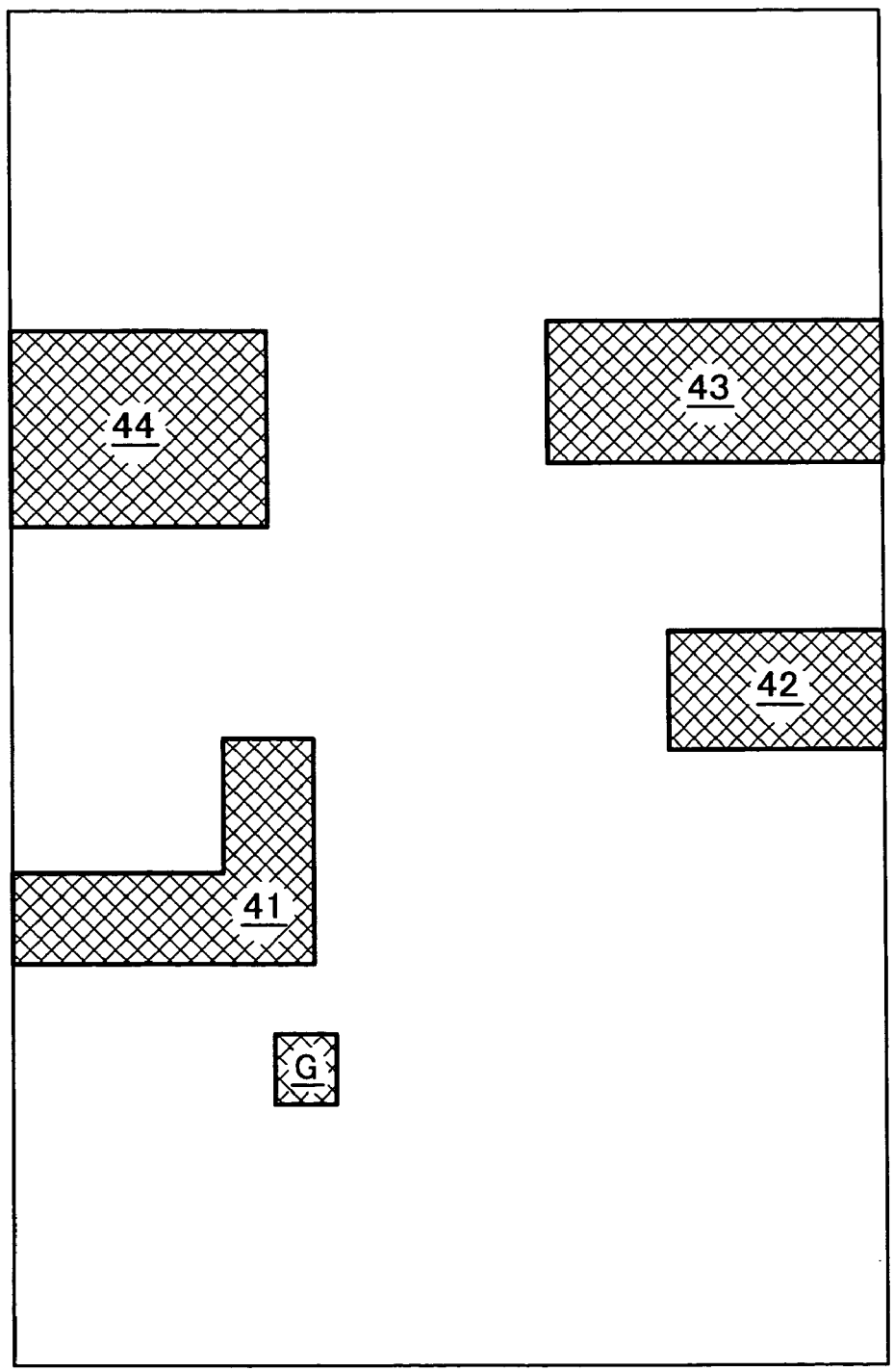
FIG. 7 shows an example of map data after registration of objects.

As the map data in FIG. 7 shows, for example, when baggage G is detected repeatedly at a position equal to or greater than 10 times, the baggage G is registered in the map data.

Figure 10:
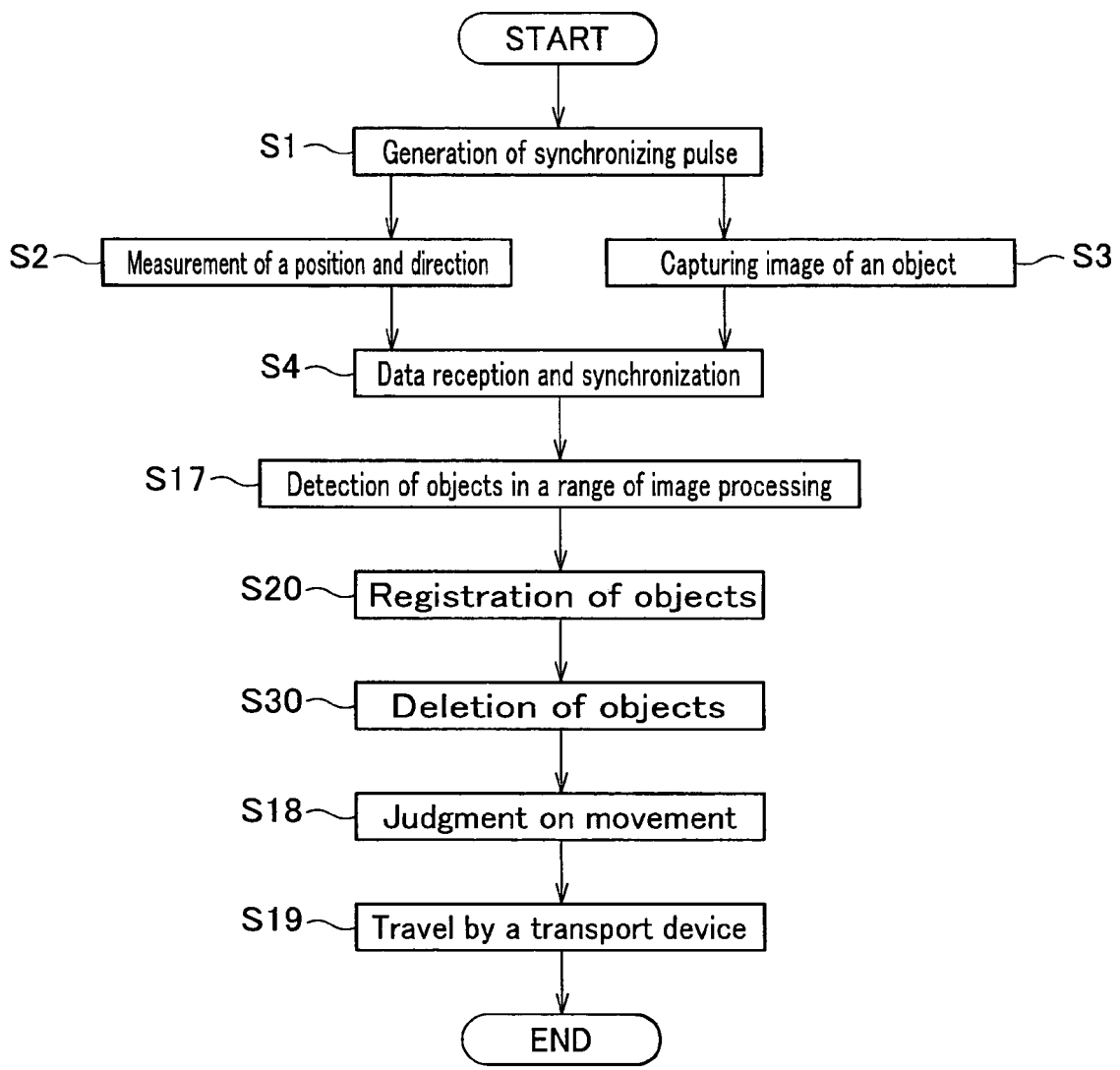
FIG. 10 is a flow diagram showing steps for a whole checking mode.

Description is now given for the operation in a whole checking mode according to the present embodiment referring to FIG. 10. Description for processes which are the same as those of a normal mode would be omitted bearing the same symbols.

A mobile apparatus 1 commands a control unit (not shown) to generate synchronizing pulses (step S1), so that a measurement device 3 measures the current position and direction of a camera 2 (step S2) and the camera 2 simultaneously captures the image of an object (step S3). The image as well as the position and direction are synchronized and enter an object detecting section 10 (step S4).

The object detecting unit 10 delivers an image to an object detecting section 15 without restriction for a range of image processing imposed by a retracting section13. In this way, the object detecting section 15 detects objects for an image free from retraction (step S17). In this case, the range of image processing coincides with a whole captured image. In the present embodiment, only a right camera 2a is selected for providing an image for detection of objects for the sake of convenience. However, an image of reference distance delivered by a recognized distance calculating section 11 may also be incorporated depending on the structure of an object detecting section 15.

A map managing section 33 executes a process for registering objects (step S20) and a process for deleting objects (step S30). Subsequently, a transport controller 20 makes a judgment on the feasibility for movement (step S18), commanding a transport device 31 to travel. In this way a mobile apparatus 1 travels (step S19).

Figure 11:
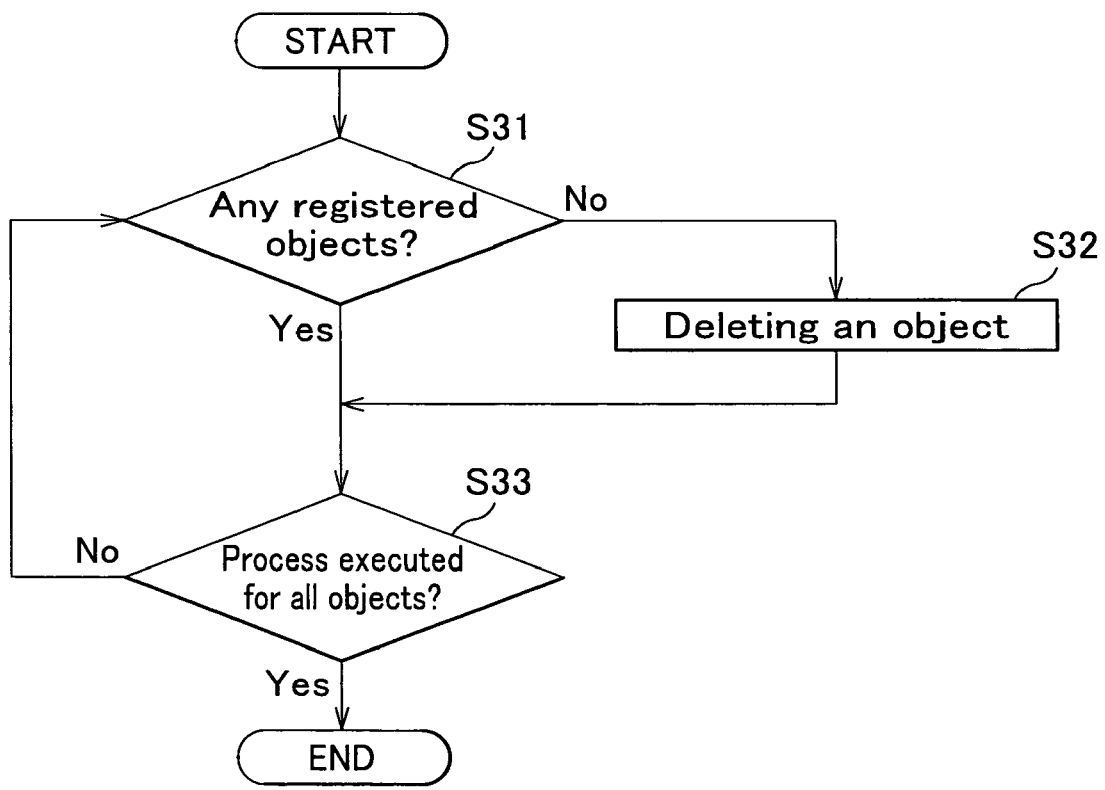
FIG. 11 is a flow diagram showing steps for deleting objects.

Description is given for the process for deleting objects at the step S30 described above. As shown in FIG. 11, it is judged if there is one in detected objects, which matches map data (step S31). If it is not (No at the step S31), the object registered in the map data is deleted (step S32). If it is (Yes at the step 31), no deleting process is done. Next, it is judged if the processes for comparing and deleting are completed for the registered objects lying within the field of view (step S33). If it is not (No at the step S33), the steps S31 and S32 are repeated. If it is (Yes at the step S33), the process for deleting objects is terminated.

A mobile apparatus 1 according to the first embodiment, in which a retracting section 13 omits an area, where an object rarely rushes into, from a range for detecting objects, allows a reduction in the load required of image processing. In this way, in a case where a robot serving as a mobile apparatus 1 moves on a stage, it is possible for the robot to travel on the stage smoothly if the outside of stage is registered as a stationary object in a map. Furthermore, even if an image captured by an imaging device includes an audience, it is possible to speed up processing if the audience is deleted from a range of image processing.

Also the mobile apparatus 1 according to the present embodiment, which is adapted to recognize an object in parallel with checking both a position of camera 2 obtained by a measurement device 3 and stationary objects registered in map data, is able to recognize the object such as a mobile object easily.

b. Second Embodiment

A second embodiment of the present invention is now described. The second embodiment is arranged so that a mobile apparatus judges an alert zone and slows down traveling speed according to a recognized distance recognized by the mobile apparatus.

Figure 12:
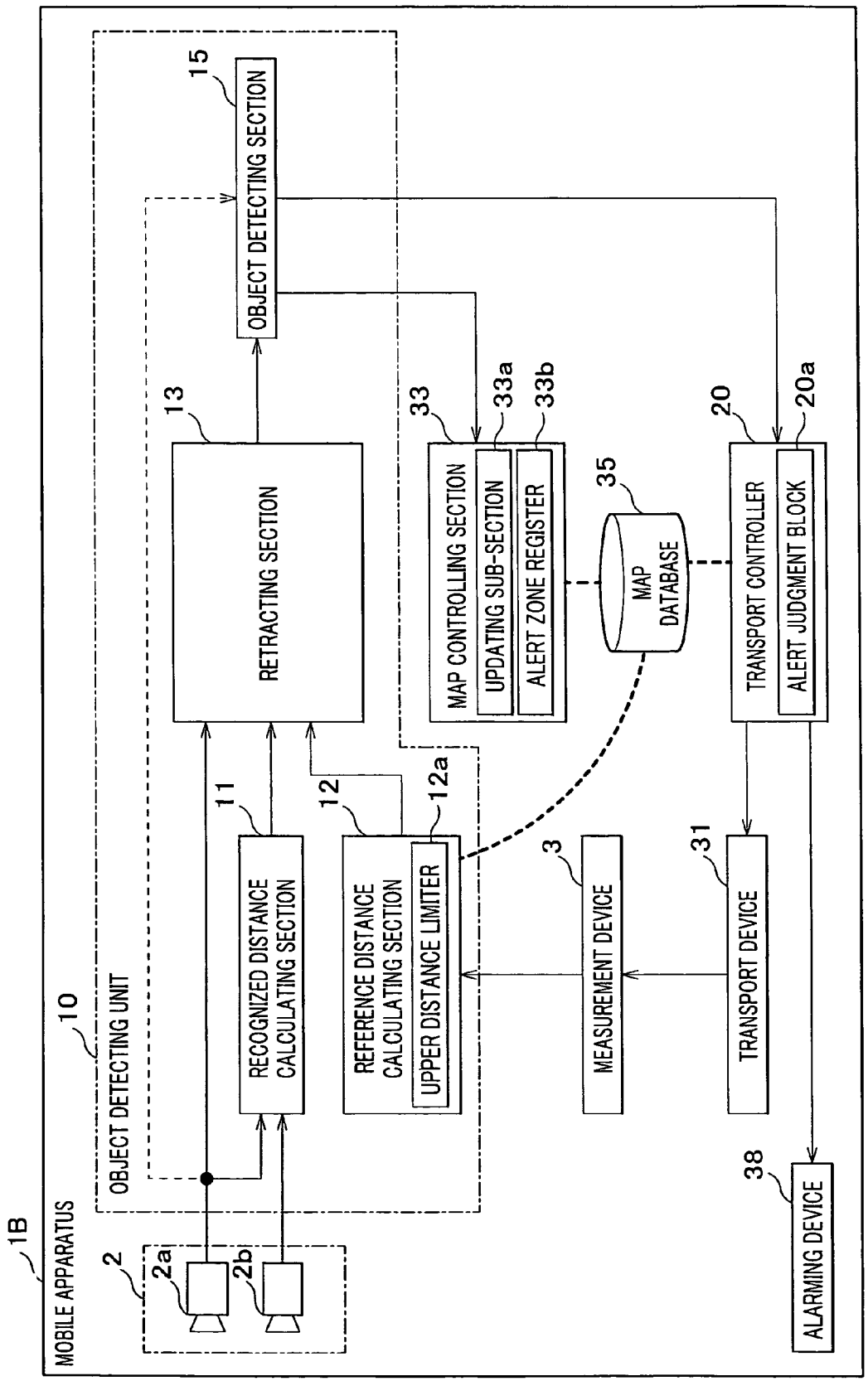
FIG. 12 is a functional block diagram illustrating a mobile apparatus of a second embodiment.

FIG. 12 is a functional block diagram illustrating a mobile apparatus 1B of the second embodiment. Items of the present embodiment which are the same as those of the first embodiment would be omitted, bearing the same symbols.

As shown in FIG. 12, the mobile apparatus 1B according to the present embodiment further includes, as compared with the first embodiment, an alert judgment block 20a in a transport controller 20, an alert zone register 33b in a map managing section 33 and an alarming device 38.

The alert judgment block 20a, which receives an image of recognized distance from a recognized distance calculating section 11, judges if the mobile apparatus 1B is required to be on the alert for the front area thereof. More specifically, if a change rate of recognized distance is equal to or greater than a predetermined value, in other words a difference in recognized distance is equal to or greater than a predetermined threshold (reference value), as a result of comparing a pair of neighboring pixels of an image of recognized distance, the alert judgment block 20a judges that an alert is required, assuming that a mobile object such as a man possibly hides behind an object. However, it is considered to be safe actually if an alert position is apart from the mobile apparatus 1B. Accordingly, if the alert position, represented by a recognized distance, is less than a predetermined value, which in the present embodiment is selected to be 2 m, the mobile apparatus 1B determines that it lies within an alert zone.

It may be possible to select an alternative method, in which the mobile apparatus 1B judges that an alert is required if a change rate of recognized distance is equal to or greater than a predetermined value, comparing recognized distances for several neighboring pixels. In this connection, the threshold can be selected freely as required instead of the exemplarily shown distance 2 m. It is also possible to select a variable value for the threshold. For example, when the mobile apparatus is a vehicle, it may be preferable to set a larger value during high speed traveling and a smaller value during low speed traveling.

The transport controller 20 is programmed so that when the alert judgment block 20a determines that the mobile apparatus 1B is in an alert zone, the transport controller 20 can generate a command ordering a reduction in traveling speed of a transport device 31. It is also arranged so that the transport controller 20 can determine traveling speed and direction safely by accessing successively to data associated with the alert zone registered in a map database 35.

The alert zone register 33b registers the information identifying an alert zone in the map database 35, when the alert judgment block 20a determines that the mobile apparatus 1B is in the alert zone.

The alarming device 38, which is triggered by the transport controller 20, notifies surrounding people of the existence of mobile apparatus 1B by an audio and visual method when the alert judgment block 20a determines that the mobile apparatus 1B is in an alert zone. Exemplary implementation of the alarming device 38 includes a voice calling "passing", a buzzer and a rotating lamp. It may be possible to select either an audio or a visual method alternatively.

Figure 13A:
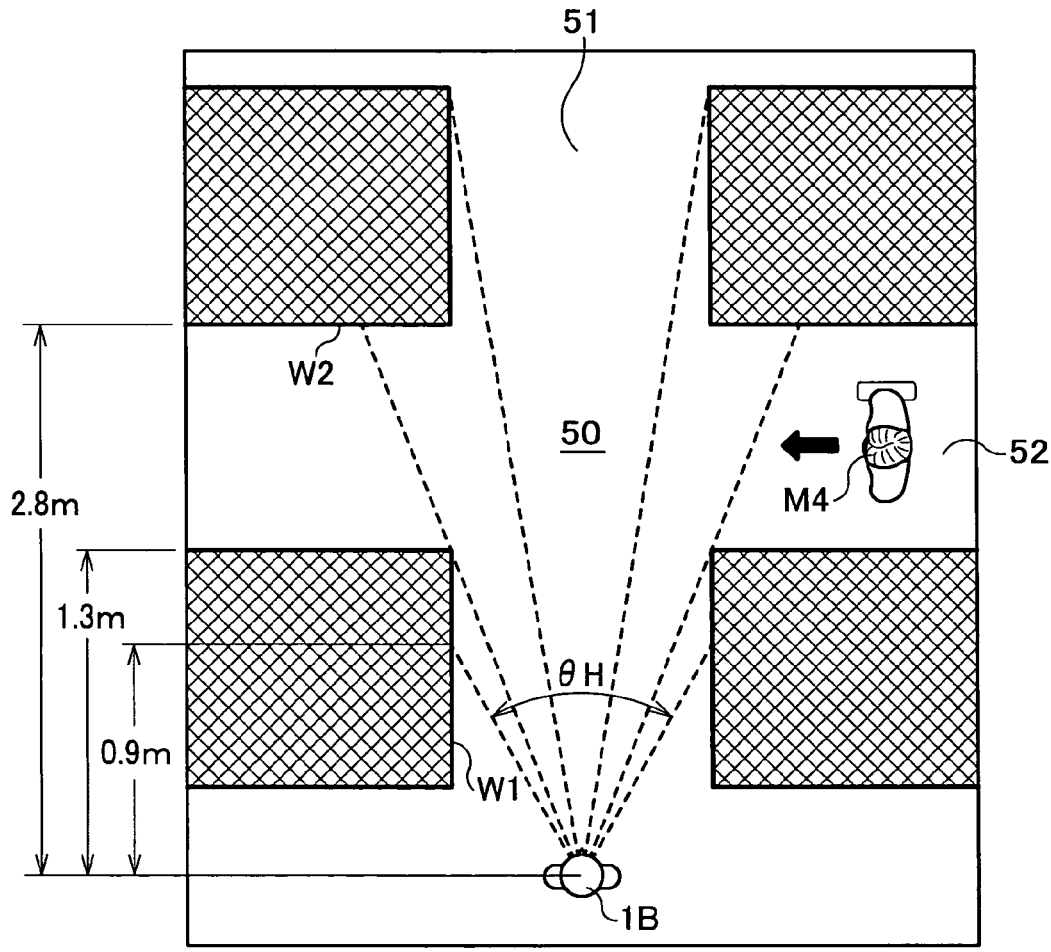
FIG. 13A is a diagram illustrating a mobile apparatus traveling in a corridor as viewed from the top.
Figure 13B:
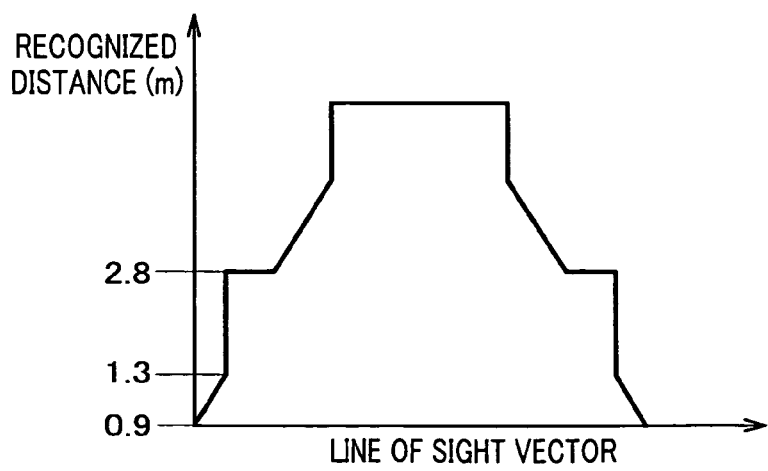
FIG. 13B is a graph showing the relationship between the direction of a line of sight vector and a recognized distance.

Operation of a mobile apparatus 1B described above is explained. FIG. 13A is a diagram illustrating the mobile apparatus 1B traveling in a corridor as viewed from the top. FIG. 13B is a graph showing the relationship between the direction of a line of sight vector and a recognized distance.

As shown in FIG. 13A, the mobile apparatus 1B has an angle of coverage THETA.sub.H horizontally. In FIG. 13A, in which hatched areas show rooms separated by walls, the mobile apparatus 1B is approaching an intersection 50 of a corridor 51 having poor view. In a passage 52 meeting the intersection 50 on the right side, a person M4 is approaching the intersection 50.

FIG. 13B is a graph showing recognized distances, which are plotted sequentially starting from the left end of a row of pixels that lies horizontally in the middle of an image captured by a camera 2. As shown in FIG. 13B, as a line of sight vector moves left to right, which coincides with starting from a pixel including an image of a wall W1 on this and left side of the intersection 50 to other pixels on the right, a recognized length takes a larger value, accordingly. At the point where the line of sight vector leaves the wall W1 and reaches the other wall W2 on that and left side of the intersection 50, the recognized distance increases suddenly from 1.3 to 2.8 m. This change of distance is representative of the width of passage 52. If the width is large enough for a mobile object to get by, it may be possible for the mobile apparatus 1B to encounter the mobile object suddenly.

Figure 14:
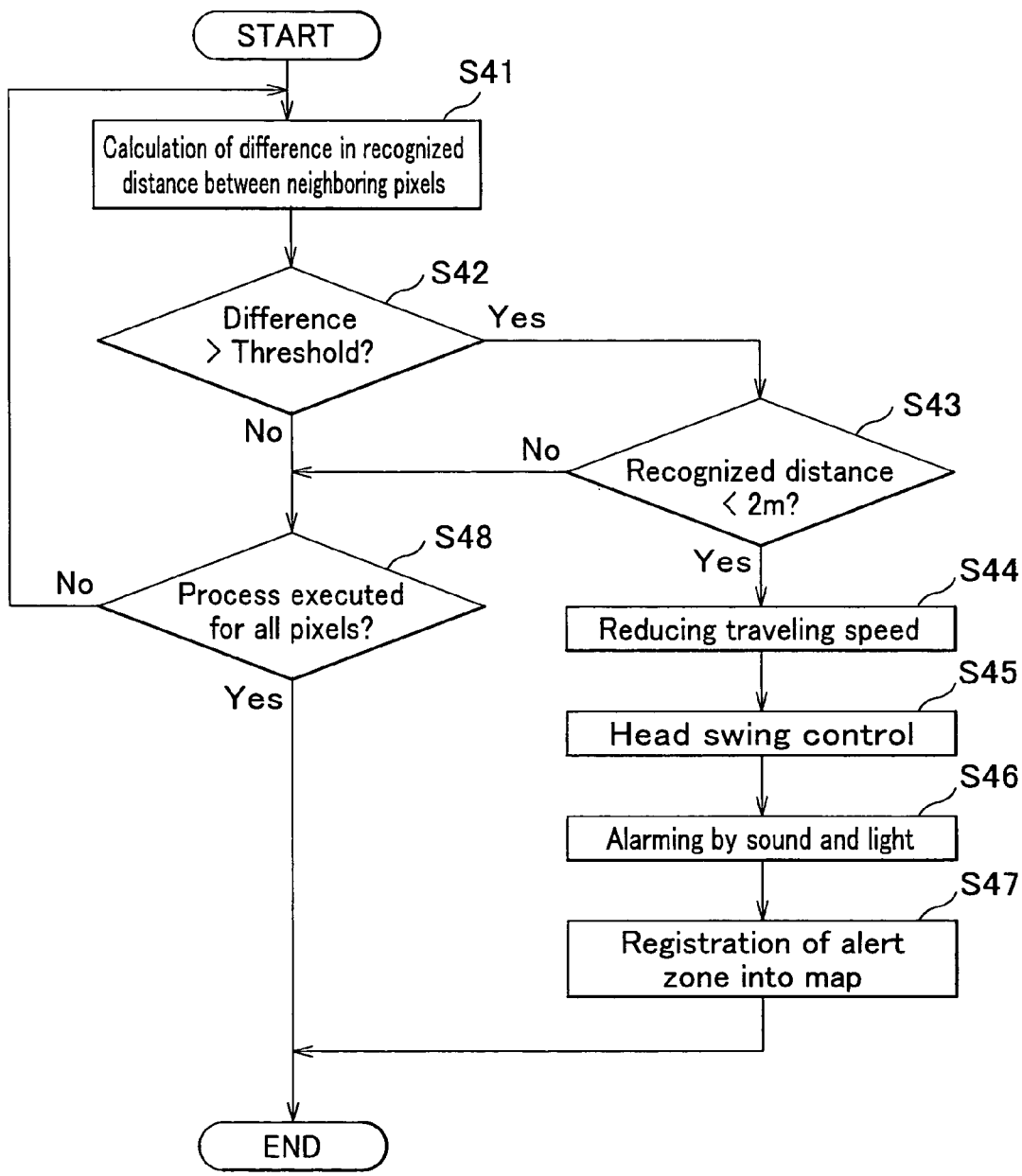
FIG. 14 is a flow diagram depicting steps for a judgment on alert zone and registration.

FIG. 14 is a flow diagram depicting a judgment on alert zone and steps for registration. Each step is described referring to FIG. 14.

An alert judgment block 20a makes a comparison between recognized distances of neighboring pixels in a row, which is located horizontally in the middle of an image, sequentially from left to right, thereby calculating a difference therebetween (step S41). Though only one middle row of pixels in an image is subjected to comparison in the above description for the sake of convenience, it may be possible to calculate a difference between neighboring recognized distances for all rows over an image. The alert judgment block 20a then judges if the difference is greater than a threshold (step S42). In this connection, when a judgment is made if a person M4 in FIG. 13 is approaching, a value such as 1.4 m may be selected. This threshold can be a constant value or a variable value which varies according to the surroundings of a mobile apparatus 1B. When the mobile apparatus 1B is a vehicle for example, it is possible to vary the threshold to 4 m for an ordinary road and 15 m for an expressway, according to the places.

If the difference is greater than the threshold (Yes at the step S42), the alert judgment block 20a judges if a recognized distance is less than 2 m (step S43). The reason for this judgment is that it is not necessary to be on the alert if an alert zone is apart from a mobile apparatus 1B by 2 m or more. If the recognized distance is less than 2 m (Yes at the step S43), the alert judgment block 20a determines the mobile apparatus 1B is in the alert zone, thereby decreasing a traveling speed to be commanded for a transport device 31 (step S44). Furthermore, the alert judgment block 20a gives the transport device 31 a command ordering control for swinging the head of mobile apparatus 1B so as to vary the direction of a camera 2, so that the camera 2 can capture images for checking the surroundings right and left and the alert judgment block 20a can check the safety (step S45). An alarming device 38 notifies the surrounding people of the existence of mobile apparatus 1B by sound and light (step S46). Methods of notification include, for example, calling "passing", sounding a buzzer and lighting a rotating light. The alert judgment block 20a notifies an alert zone register 33b that the mobile apparatus 1B is in an alert zone, as shown in step S47, so that the alert zone register 33b registers the information that the current position of the mobile apparatus 1B is in the alert zone in a map database 35.

On the other hand if the difference is equal to or greater than the threshold (No at the step S42), checking is made if the judgment is completed for all the pixels (line of sights) (step S48). If it is not (No at the step S48), steps are repeated from the step S41. If it is (Yes at the step S48), the flow is terminated.

A mobile apparatus 1B of the second embodiment, which decreases traveling speed when it anticipates the necessity of being on the alert while approaching a place having poor view, is able to achieve the safety thereof. Since the information associated with an alert zone is registered in a map database 35, the mobile apparatus 1B is able to prepare for the safety in advance by accessing to the information when it travels the same place next time.

While the invention has been described in detail and with reference to specific embodiments thereof, it will be apparent to one skilled in the art that various changes and modifications can be made therein without departing from the spirit and scope thereof. For example, it is not limited to the second embodiment, which judges the necessity of being on the alert according to a recognized distance, but may be possible alternatively for an alert judgment block 20a to judge the necessity according to a reference distance calculated by a reference distance calculating section 12. In other words, it may be possible to determine that a mobile apparatus is in an alert zone if the change rate of reference distance between neighboring pixels is equal to or greater than a predetermined value.

What is claimed is:

1. A mobile apparatus comprising:
   a plurality of imaging devices, wherein the apparatus travels recognizing objects based on a plurality of images thereof captured by the imaging devices;
   a measurement device, wherein the device measures a current position and direction of the imaging devices;
   a map data storing section, wherein the section stores map data including at least registered information on positions of stationary objects that exist within a region where the apparatus travels;
   a recognized distance calculating section, wherein the section calculates a recognized distance for each pixel according to a parallax of pixels for the plurality of images;
   a reference distance calculating section, wherein the section calculates a reference distance from the imaging devices to a front border of each stationary object according to the current position and direction measured by the measurement device and the map data;
   a retracting section for determining a range of image processing, wherein the section compares the recognized distance of a pixel of each image with the reference distance corresponding thereto, thereby selecting a set of pixels to be processed so as to generate a retracted image;
   a detecting section for detecting the objects from the retracted image;
   a transport device; and
   a transport controller for controlling movement of the transport device according to information about the objects detected by the detecting section.

2. A mobile apparatus according to claim 1, wherein the retracting section is adapted to select the set of pixels out of the images, whose recognized distances are smaller than reference distances thereof, so that the section can generate the retracted image.

3. A mobile apparatus according to claim 1, wherein the retracting section is adapted to generate the retracted image incorporating a whole image when number of pixels, whose recognized distances are greater than reference distances by a first predetermined value or more, is equal to or greater than a second predetermined value.

4. A mobile apparatus according to claim 1, wherein the reference distance calculating section has a limiter for setting an upper limit of distance which controls the reference distance to be less than or equal to the upper limit.

5. A mobile apparatus according to claim 1 further comprising a map managing section, wherein the map managing section labels to store the data of an object detected by the detecting section, and if the object is detected repeatedly at a position equal to or greater than a predetermined times, the map managing section commands the map data storing section to store at least the information about the position correlated with the object as the map data.

6. A mobile apparatus according to claim 5, wherein the map managing section comprises an updating section which deletes a stationary object registered in the map data from the map data storing section if the stationary object is not detected.

7. A mobile apparatus according to claim 1, wherein when a change rate of recognized distance is equal to or greater than a third predetermined value in a distribution of recognized distance calculated by the recognized distance calculating section, the transport controller judges that the mobile apparatus is in an alert zone and gives a command ordering a reduction in traveling speed of the transport device.

8. A mobile apparatus according to claim 7, wherein when the transport controller judges that the mobile apparatus is in the alert zone, the transport controller changes a direction of the imaging devices.

9. A mobile apparatus according to claim 7, wherein when the transport controller judges that the mobile apparatus is in the alert zone, the transport controller gives alarming to surrounding people with one of audio and visual methods.

10. A mobile apparatus according to claim 1, wherein when a change rate of reference distance is equal to or greater than a fourth predetermined value in a distribution of reference distance calculated by the reference distance calculating section, the transport controller judges that the mobile apparatus is in an alert zone and gives a command ordering a reduction in traveling speed of the transport device.

11. A mobile apparatus according to claim 10, wherein when the transport controller judges that the mobile apparatus is in the alert zone, the transport controller changes a direction of the imaging devices.

12. A mobile apparatus according to claim 10, wherein when the transport controller judges that the mobile apparatus is in the alert zone, the transport controller gives alarming to surrounding people with one of audio and visual methods.

* * * * *